US009784925B2

(12) United States Patent
Bushnell et al.

(10) Patent No.: US 9,784,925 B2
(45) Date of Patent: Oct. 10, 2017

(54) TUNABLE MPO CONNECTOR

(71) Applicant: CommScope, Inc. of North Carolina, Hickory, NC (US)

(72) Inventors: Brian K. Bushnell, Wylie, TX (US); Earl R. Parsons, Allen, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 15/072,074

(22) Filed: Mar. 16, 2016

(65) Prior Publication Data

US 2016/0274313 A1    Sep. 22, 2016

Related U.S. Application Data

(60) Provisional application No. 62/133,948, filed on Mar. 16, 2015.

(51) Int. Cl.
*G02B 6/38* (2006.01)

(52) U.S. Cl.
CPC ............ *G02B 6/3882* (2013.01); *G02B 6/385* (2013.01); *G02B 6/3885* (2013.01)

(58) Field of Classification Search
None
See application file for complete search history.

(56) References Cited

U.S. PATENT DOCUMENTS

| | | | |
|---|---|---|---|
| 5,926,596 A | 7/1999 | Edwards et al. | |
| 6,340,247 B1 | 1/2002 | Sakurai et al. | |
| 6,371,658 B2 * | 4/2002 | Chong | G02B 6/383 385/52 |
| 6,402,338 B1 | 6/2002 | Mitzel et al. | |
| 6,474,877 B1 | 11/2002 | Shahid | |
| 6,497,516 B1 * | 12/2002 | Toyooka | G02B 6/3882 385/78 |
| 6,505,976 B1 * | 1/2003 | Grois | G02B 6/3869 385/60 |
| 6,886,988 B2 * | 5/2005 | Brown | G02B 6/3882 385/53 |
| 7,204,016 B2 | 4/2007 | Roth et al. | |

(Continued)

FOREIGN PATENT DOCUMENTS

EP    0800100 A1 * 10/1997
JP    3-257406 A * 11/1991

(Continued)

*Primary Examiner* — Mike Stahl
(74) *Attorney, Agent, or Firm* — Muncy, Geissler, Olds & Lowe, P.C.

(57) ABSTRACT

An MPO connector includes a pin configuration with an elongated shaft extending along an axis A. A first portion proximate a first end of the shaft includes a tool surface feature for engagement by a tool to impart a rotation to the shaft. A second portion proximate a second end of the shaft is cylindrical and centered on an axis B, offset relative to the axis A. A method of minimizing insertion loss between mating channels of mated MPO connectors includes inserting light into a channel of a first MPO connector, then measuring an intensity of light output from a channel of a second MPO, mated to the first MPO connector. A pin associated with one of the mated MPO connectors is rotated to a point where the measured light output from the channel of the second MPO connector is approximately maximized.

20 Claims, 12 Drawing Sheets

(56) References Cited

U.S. PATENT DOCUMENTS

| | | |
|---|---|---|
| 7,416,347 B2 | 8/2008 | Livingston et al. |
| 7,537,393 B2 | 5/2009 | Anderson et al. |
| 7,758,257 B2 | 7/2010 | Anderson et al. |
| 7,845,859 B2 | 12/2010 | Roth et al. |
| 2001/0007603 A1 | 7/2001 | Sakurai et al. |
| 2001/0008571 A1 | 7/2001 | Chivers |
| 2003/0087505 A1 | 5/2003 | Deane |
| 2004/0042733 A1 | 3/2004 | Kang et al. |
| 2004/0057671 A1 | 3/2004 | Kang et al. |
| 2004/0117981 A1 | 6/2004 | Roth et al. |
| 2004/0152354 A1* | 8/2004 | Luther ............... G02B 6/3846 439/378 |
| 2004/0184738 A1* | 9/2004 | McColloch ......... G02B 6/3873 385/53 |
| 2005/0069264 A1 | 3/2005 | Luther et al. |
| 2005/0271338 A1 | 12/2005 | Livingston |
| 2006/0029334 A1 | 2/2006 | Quinby et al. |
| 2006/0257076 A1* | 11/2006 | Seeley ............... G02B 6/3831 385/60 |
| 2006/0275007 A1 | 12/2006 | Livingston et al. |
| 2007/0193025 A1 | 8/2007 | Roth et al. |
| 2009/0226140 A1 | 9/2009 | Belenkiy et al. |
| 2009/0257718 A1 | 10/2009 | Nishimura et al. |
| 2009/0290838 A1 | 11/2009 | Lin et al. |
| 2011/0044583 A1 | 2/2011 | Dalton et al. |
| 2011/0249943 A1 | 10/2011 | Case et al. |
| 2011/0262075 A1* | 10/2011 | Beatty ............... G02B 6/3882 385/60 |
| 2014/0105548 A1 | 4/2014 | Takahashi et al. |
| 2014/0147084 A1* | 5/2014 | Yabre ............... G02B 6/30 385/88 |
| 2014/0219609 A1 | 8/2014 | Nielson et al. |
| 2017/0102505 A1* | 4/2017 | Nguyen ............. G02B 6/3882 |

FOREIGN PATENT DOCUMENTS

| | | | |
|---|---|---|---|
| JP | 4-356004 A | * 12/1992 | |
| JP | 2011-221397 A | 11/2011 | |

* cited by examiner

TUNABLE MPO CONNECTOR

This application claims the benefit of U.S. Provisional Application No. 62/133,948, filed Mar. 16, 2015, which is herein incorporated by reference.

BACKGROUND OF THE INVENTION

1. Field of the Invention

The present invention relates to multi-channel fiber optic connectors. More particularly, the present invention relates to a new pin configuration for MPO-type connectors, which allows for adjustments and better mating between MPO-type connectors, e.g., to minimize insertion loss between mating channels of mated MPO connectors.

2. Description of the Related Art

Cords and cables with multiple-fiber push-on/pull-off (MPO) connectors are generally known in the art. Such connectors relate to IEC-61754-7 and EIA/TIA 604-5 (FO-CIS 5) standards, which are incorporated herein by reference. MPO connectors typically exist in two genders—male with alignment pins or female without alignment pins.

Figure 1:
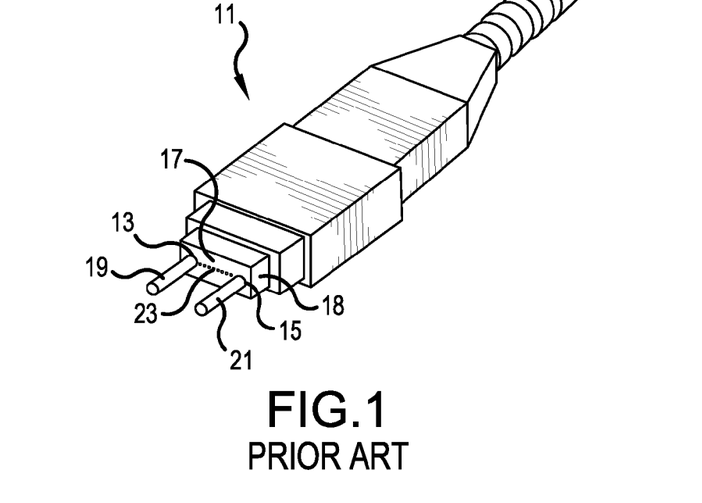
FIG. 1 is a front perspective view of a male MPO connector, in accordance with the prior art.

In FIG. 1, reference numeral 11 denotes a male MPO connector, in accordance with the prior art. In initial construction, the male MPO connector 11 has first and second holes 13 and 15 formed in a termination end or front face 17 of a first ferrule 18. First and second alignment pins 19 and 21 reside within the first and second holes 13 and 15, respectively, and protrude away from the front face 17 of the first ferrule 18.

Fiber ends 23 are located in a single row and are aligned between the first and second alignment pins 19 and 21. Although FIG. 1 illustrates eight fiber ends 23 located between the first and second alignment pins 19 and 21, it is known to have twelve fiber ends 23 in a single row, twenty-four fiber ends 23 in two rows, forty-eight fiber ends 23 in four rows, or seventy-two fiber ends 23 in six rows between the first and second alignment pins 19 and 21.

Figure 2:
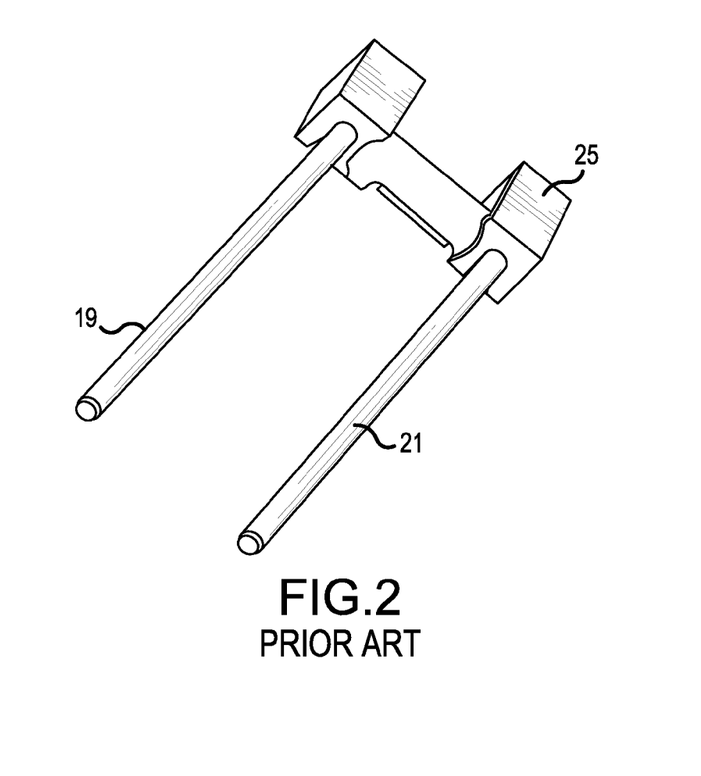
FIG. 2 is a front perspective view of a pin clamp for the MPO connector of FIG. 1.

FIG. 2 illustrates a pin clamp 25, which is assembled into the male MPO connector 11. The pin clamp 25 holds the first and second alignment pins 19 and 21, so that the first and second alignment pins 19 and 21 are well anchored within the front face 17 of the first ferrule 18 and not easily removed from the male MPO connector 11 during unmating of the male MPO connector 11 from a female MPO connector or during unmating from a female MPO port.

Figure 3:
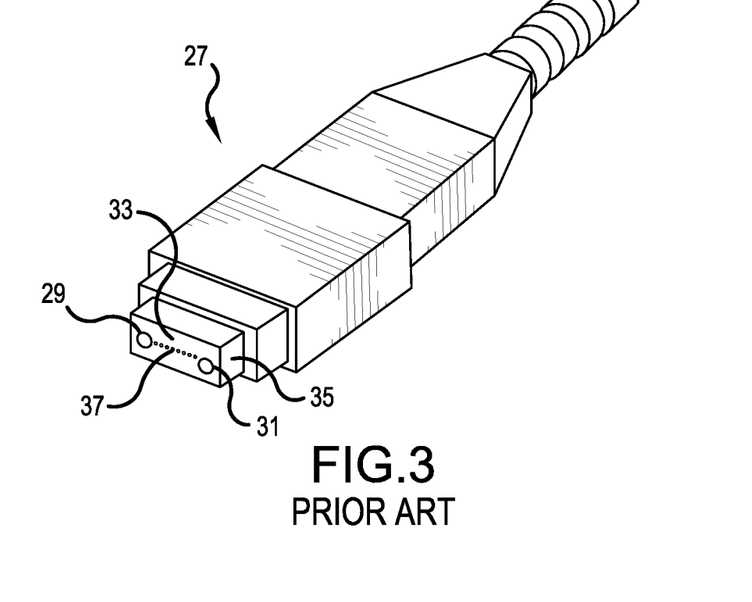
FIG. 3 is a front perspective view of a female MPO connector, in accordance with the prior art.

In FIG. 3, reference numeral 27 denotes a female MPO connector, in accordance with the prior art. The female MPO connector 27 has third and fourth holes 29 and 31 formed in a termination end or front face 33 of a second ferrule 35. The third and fourth holes 29 and 31 are empty and do not possess any alignment pins. Rather, the third and fourth holes 29 and 31 are provided as guidance holes to receive the first and second alignment pins 19 and 21 of a mating male MPO connector 11 or mating male MPO port.

Fiber ends 37 are located in a single row and are aligned between the third and fourth holes 29 and 31. Although FIG. 3 illustrates eight fiber ends 37 located between the third and fourth holes 29 and 31, it is known to have twelve fiber ends 37 in a single row, twenty-four fiber ends 37 in two rows, forty-eight fiber ends 37 in four rows, or seventy-two fiber ends 37 in six rows between the third and fourth holes 29 and 31.

Figure 4:
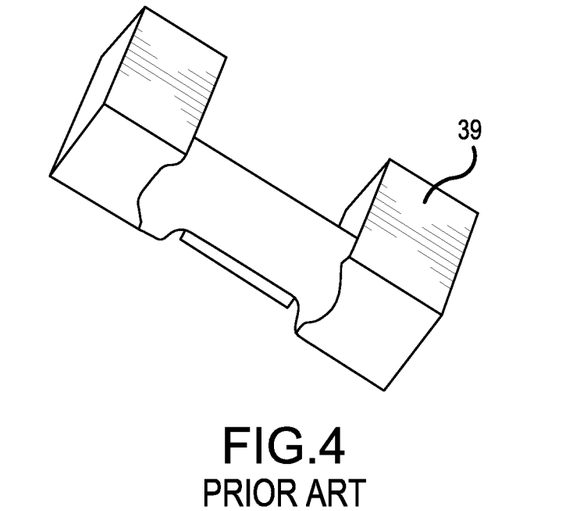
FIG. 4 is a front perspective view of a pin clamp for the MPO connector of FIG. 3.

FIG. 4 illustrates a spacer clamp 39, which is assembled into the female MPO connector 27. The spacer clamp 39 has dimensions similar to the pin clamp 25 of FIG. 2. The spacer clamp 39 may assist in manufacturing the female MPO connector 27, such that the female MPO connector 27 may be manufactured using process steps and equipment similar to the process steps and equipment used to manufacture the male MPO connectors 11, except that the step of inserting the first and second alignment pins 19 and 21 is omitted.

Figure 5:
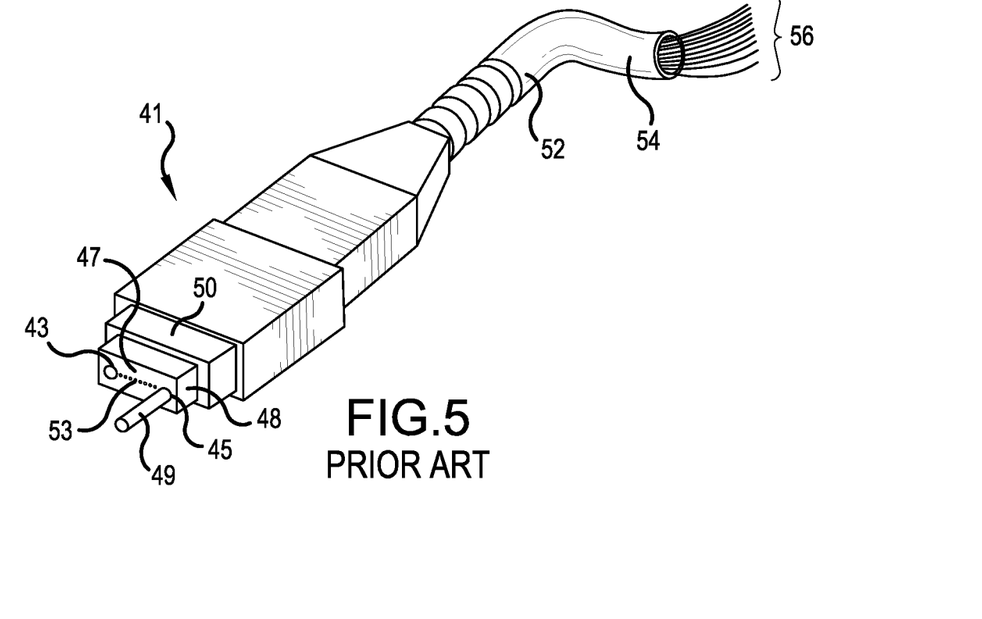
FIG. 5 is a front perspective view of a genderless MPO connector, in accordance with the prior art.

FIG. 5 illustrates a genderless MPO connector 41 in accordance with the prior art as depicted in published U.S. Application 2011/0249943, which is herein incorporated by reference. In initial construction, the genderless MPO connector 41 has first and second holes 43 and 45 formed in a termination side or front face 47 of a first, genderless, MPO ferrule 48. The first ferrule 48 is attached to a housing 50. A first alignment pin 49 resides within the second hole 45 and protrudes away from the front face 47 of the first ferrule 48. The first hole 43 remains empty and does not possess any alignment pin. Rather, the first hole 43 is provided as a guidance hole extending into the first ferrule 48 to receive an alignment pin of a mating genderless MPO connector or mating genderless MPO port.

Fiber ends 53 are located in a single row and are aligned between the first hole 43 and the first alignment pin 49. Although FIG. 5 illustrates eight fiber ends 53 located between the first hole 43 and the first alignment pin 49, other configurations are possible. For example, the fiber ends 53 may include twelve fiber ends 53 in a single row, twenty-four fiber ends 53 in two rows, forty-eight fiber ends 53 in four rows, or seventy-two fiber ends 53 in six rows between the first hole 43 and the first alignment pin 49.

Figure 6:
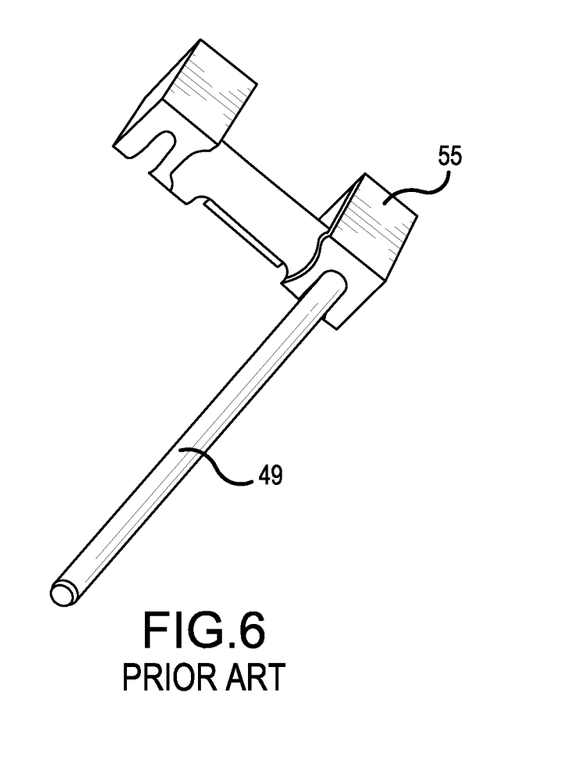
FIG. 6 is a front perspective view of a pin clamp for the MPO connector of FIG. 5.

FIG. 6 illustrates a pin clamp 55, which is assembled into the genderless MPO connector 41. The pin clamp 55 holds the first alignment pin 49, so that the first alignment pin 49 is well anchored within the front face 47 of the first ferrule 48 and is not easily removed from the genderless MPO connector 41 during unmating of the genderless MPO connector 41 with a genderless MPO connector or during unmating with a genderless MPO port.

The termination side or front face 47 of the first ferrule 48 is the side closest to the mating MPO connector or mating MPO port. The front face 47 presents a generally flat ferrule face. A side of the first ferrule 48 opposite to the front face 47 includes a strain relief boot 52. Fibers 56 exit from the first ferrule 48 on the side opposite to the front face 47 then pass through the strain relief boot 52 before entering into fiber optic cordage 54.

Figure 7:
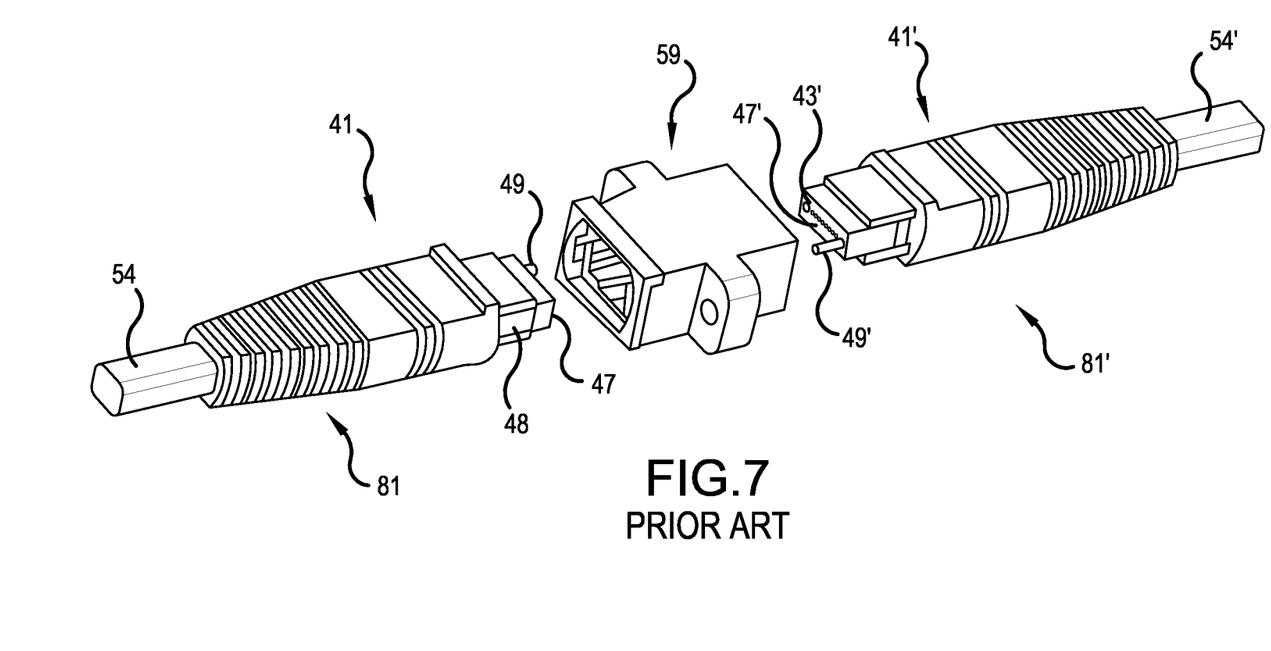
FIG. 7 is a front perspective view two genderless MPO connectors of FIG. 5 just prior to mating via an adapter.

FIG. 7 illustrates a preferred structure for establishing a connection between a first genderless MPO patch cord 81 and a second genderless MPO patch cord 81'. Such a connection may be referred to as a daisy-chain connection between first and second MPO patch cords 81 and 81'. In FIG. 7, the mating of the genderless MPO connectors 41 and 41' occurs inside of an MPO alignment adapter 59. The MPO alignment adapter 59 provides initial course alignment prior to the entrance of the guide pins 49, 49' within the guide holes 43, 43'. The MPO alignment adapter 59 also provides environmental, e.g., dust, protection at the mating faces 47, 47'.

SUMMARY OF THE INVENTION

Applicant has discovered that in all of the embodiments of FIGS. 1-7, the alignment between the fiber ends 23 and 37 in the case of mated connectors 11 and 27, and fiber ends 53 and 53' in the case of mated connectors 41 and 41', is critical to ensure that insertion losses in the communication channels is not exceeded. The alignment is determined by the tolerances (dimensions and placements) of the pins and holes in the mating faces.

For example, when mating the connector 11 of FIG. 1 to the connector 27 of FIG. 3, the tolerances of the pins 19 and 21 and the tolerances of the holes 29 and 31 will determine the alignment of the fiber ends 23 and 37. If the pin dimensions or pin placements in the face 17 of MPO connector 11 are poor, the alignment between the fiber ends 23 and 37 will not be precise, and insertion loss will occur between mating channels of the mated MPO connectors 11 and 27. Likewise, if the dimensions of the holes 29 and 31 or hole placements in the face 33 of MPO connector 27 are poor, the alignment between the fiber ends 23 and 37 will not be precise, and insertion loss will occur between mating channels of the mated MPO connectors 11 and 27. The same tolerance issues leading to insertion loss also exist for the MPO connector 41 of FIG. 5.

Applicant has invented a new pin configuration for an MPO-type connector, which addresses one or more of the drawbacks, as noted above.

These and other objects are accomplished by a multi-channel fiber optic connector, e.g., of the MPO-type, having at least one pin for engagement within at least one hole of a mating multi-channel fiber optic connector. The pin having a tool surface feature configured to be engaged by a tool, so that the pin may be moved in relation to the connector, e.g., to impart a rotation to the pin. An engagement end of the pin has an offset portion, which slightly moves the mated multi-channel fiber optic connector when the pin is rotated.

Movement of the pin enables a method of minimizing insertion loss between mating channels of mated connectors. For example, a tuning device may be used where a first MPO connector may be mated to a second MPO connector. Light is inserted into at least one channel of the first MPO connector. A light output from at least one channel of the second MPO connector is measured. The pin is moved using a tool to a point where the measured light output from the at least one channel of the second MPO connector is approximately maximized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 8:
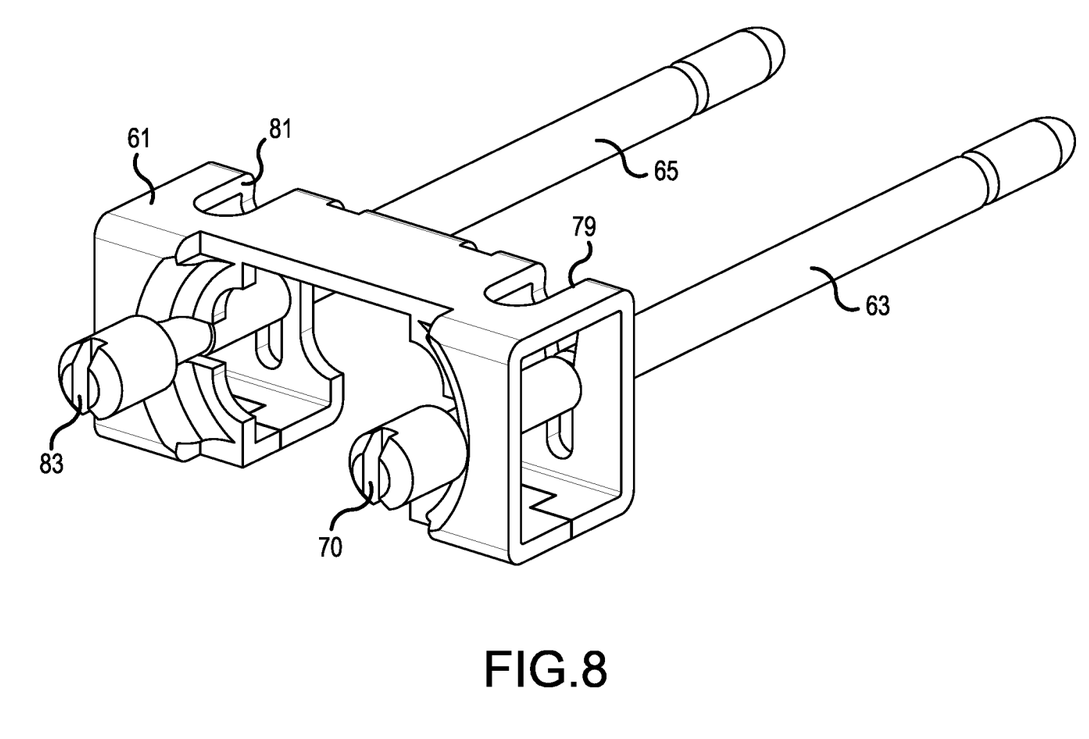
FIG. 8 is a rear perspective view of a pin clamp with pins for a male MPO connector, in accordance with the present invention.
Figure 9:
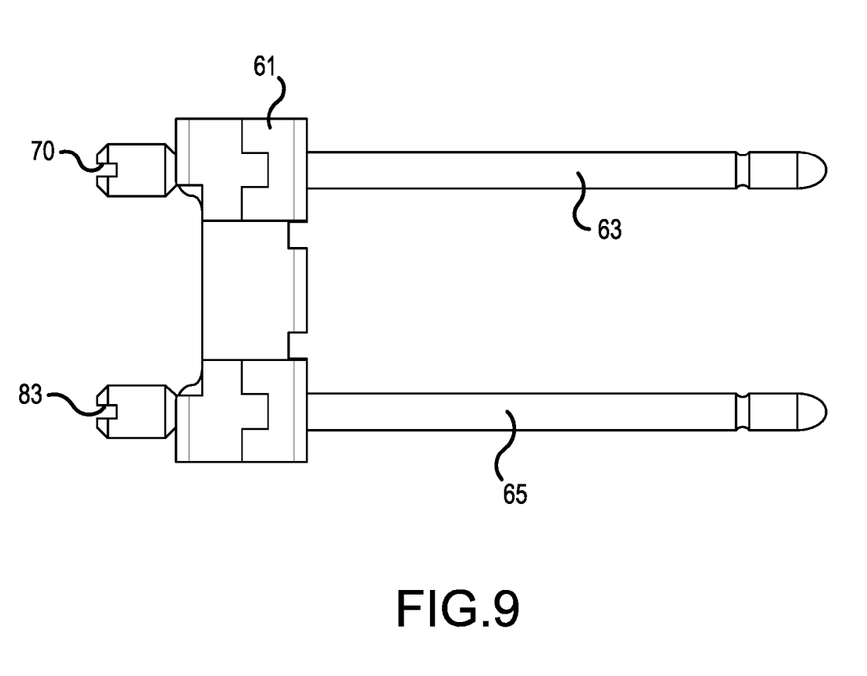
FIG. 9 is a bottom view of the pin clamp of FIG. 8.
Figure 10:
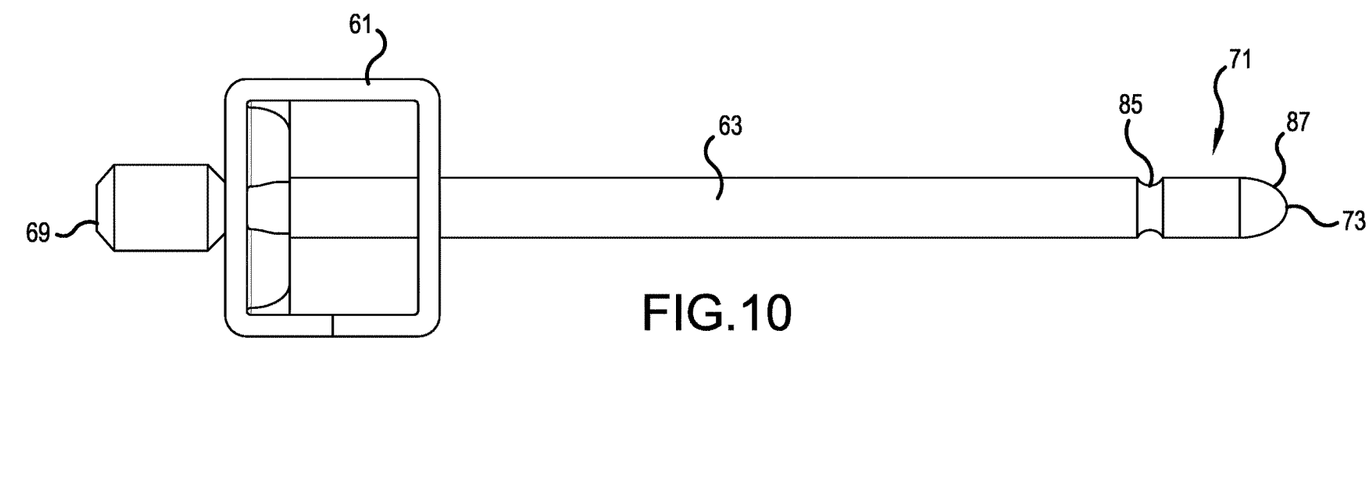
FIG. 10 is a right side view of the pin clamp of FIG. 8.
Figure 11:
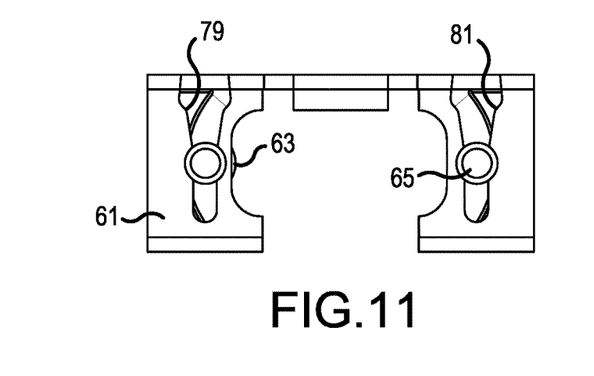
FIG. 11 is a front view of the pin clamp of FIG. 8.

FIG. 8 is a rear perspective view of a male pin clamp 61 for an MPO connector, in accordance with the present invention. FIGS. 9, 10 and 11 are a bottom view, a right side view and a front view of the pin clamp 61 of FIG. 8, respectively.

In FIGS. 8-11, the pin clamp 61 is sized and shaped to fit in the first ferrule 18 of the male MPO connector 11 of FIG. 1. For example, the pin clamp 61 fits an MT type ferrule, where the pin clamp 61 is located behind or within the MT type ferrule, and the MT type ferrule is adapted to be accepted/connected into an MPO connector envelope to form the male MPO connector 11.

The pin clamp 61 holds first and second alignment pins 63 and 65, so that the first and second alignment pins 63 and 65 are well anchored within the front face 17 of the first ferrule 18 and not easily removed from the male MPO connector 11 during unmating of the male MPO connector 11 from a female MPO connector or during unmating from a female MPO port. In a preferred embodiment, the first alignment pin 63 is constructed the same as the second alignment pin 65. Therefore, the construction of the first alignment pin 63 will now be described in detail.

Figure 12:
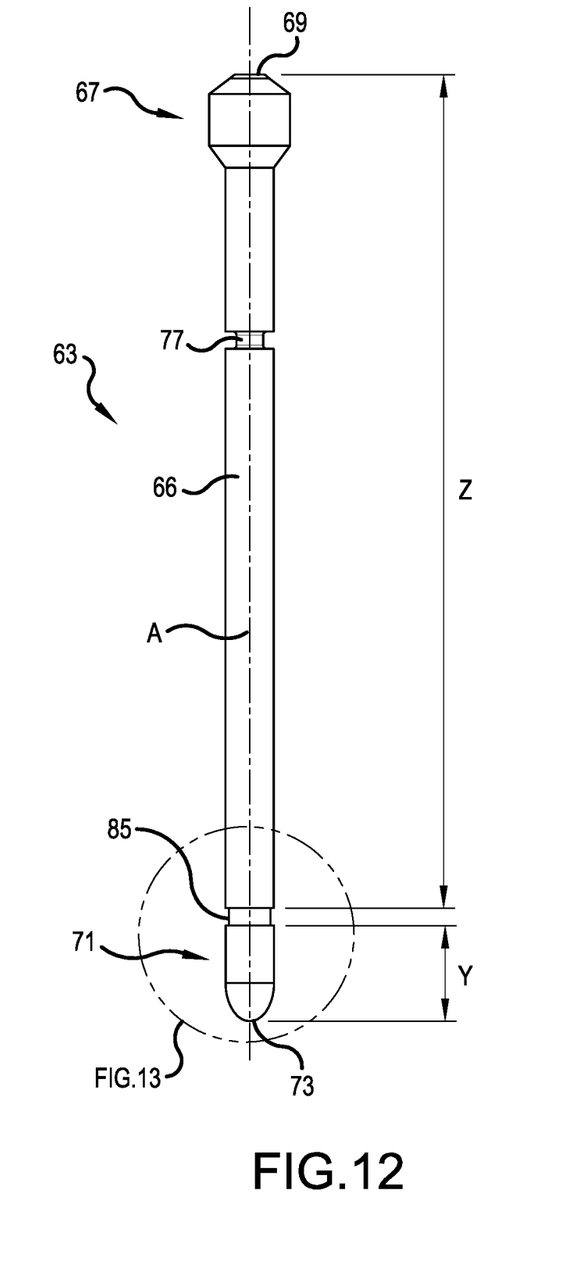
FIG. 12 a side view of a first pin in FIG. 8.
Figure 13:
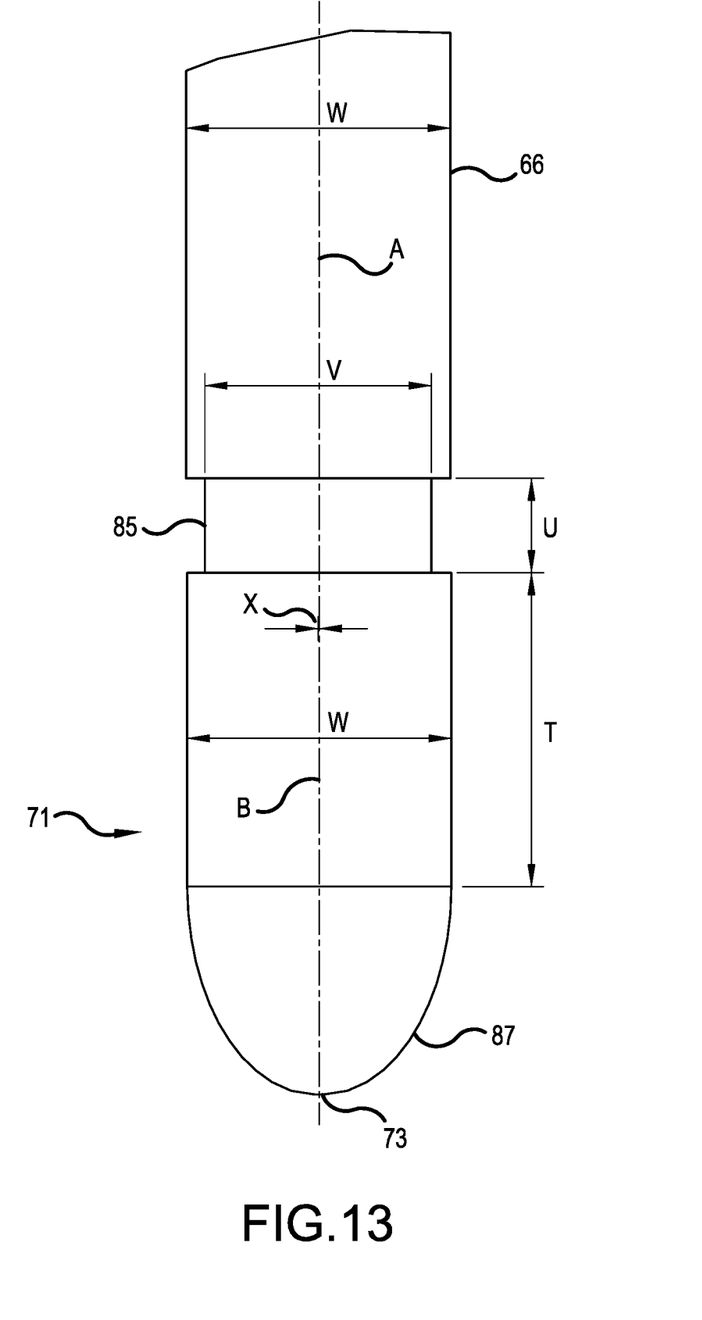
FIG. 13 is a close-up view of an end of the first pin in FIG. 12.

As best seen in FIG. 12, the first alignment pin 63 is mostly formed as a generally elongated shaft 66 extending along an axis A. A diameter W (FIG. 13) of the elongate shaft 66 is between 0.5 and 0.9 mm, such as in the range of 0.6 and 0.8 mm. In a preferred embodiment, the diameter W is about 0.7 mm. In a preferred embodiment, the first pin 63 is formed of stainless steel. However, other materials may be used in the construction of the first pin 63, while still achieving the objects and advantages of the present invention.

Figure 14:
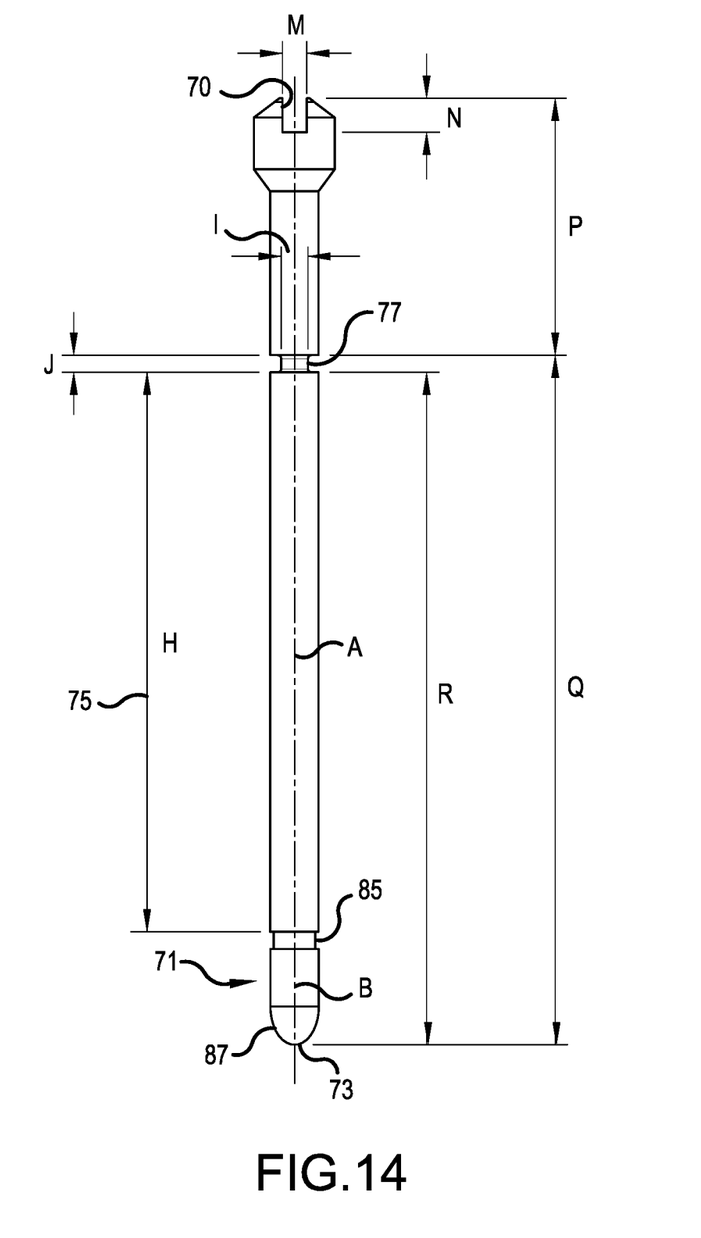
FIG. 14 is another side view of the first pin of FIG. 12, after the pin has been rotated ninety degrees.

A first portion 67 proximate a first end 69 of the shaft 66 includes a first tool surface feature 70 configured to be engaged by a tool to impart a rotation to the shaft 66. The first portion 67 has a length P (FIG. 14). The length P is greater than 1 mm, such as between 2 mm and 8 mm. In a preferred embodiment, the length P is about 3.75 mm.

The first tool surface feature 70 is illustrated as a slot cut into said first end 69 of said shaft 66 to engage with a flat bladed screwdriver. The slot has a width M and a depth N. In a preferred embodiment, the width M is about 0.4 mm and the depth N is about 0.5 mm. However, the dimension M and N may be changed to fit other tool blades. Moreover, the first tool surface feature 70 may alternatively be formed for engagement by a Philips screwdriver, an allen key, a star key, a square key, or any other known tool, or may be formed as a gear with peripheral features, e.g., teeth, to be engaged by a tool.

A second portion 71 resides proximate a second end 73 of the shaft 66. The second portion 71 has a length Y (FIG. 12) and a diameter W. In a preferred embodiment, the diameter W is the same as the diameter W of the shaft 66. The length Y is greater than 0.5 mm, such as between 1 mm and 2.5 mm, or between 1.25 mm and 1.5 mm. In a preferred embodiment, the length Y is about 1.38 mm.

A mid-portion 75 of said shaft 66 (see FIG. 14) resides between the first portion 67 and the second portion 71. The mid-portion 75 has a length H (FIG. 14). The length H is greater than 5 mm, such as between 6 mm and 12 mm, or between 7 mm and 9 mm. In a preferred embodiment, the length Y is about 8.25 mm. The mid-portion 75 is substantially cylindrical and centered on the axis A. In a preferred embodiment as best seen in the close-up view of FIG. 13, the second portion 71 is a substantially cylindrical section and centered on an axis B, where the axis B is parallel to, but offset from, the axis A by a distance X. In one embodiment, the distance X is at least 1.5 um, such as greater than 2.0 um from said axis A. In a preferred embodiment, the distance X is at least 3.0 um.

A first recessed ring 77 is formed into the shaft 66 between the mid-portion 75 of the shaft 66 and the first portion 67 of the shaft 66. The first recessed ring 77 has a reduced diameter I (FIG. 14) as compared to the overall shaft diameter W, and a length J. The reduced diameter I is between 0.35 and 0.8 mm, such as in the range of 0.4 to 0.7 mm. In a preferred embodiment, the reduced diameter I is about 0.5 mm. Alternatively stated, the reduced diameter I is about 0.2 mm less than the diameter W of the shaft 66. The length J is in the range of 0.1 mm to 0.5 mm, such as between 0.2 mm and 0.4 mm. In a preferred embodiment, the length J is about 0.25 mm. The first recessed ring 77 is dimensioned to fit into a first channel 79 of the pin clamp 61 (See FIG. 8).

A second recessed ring 85 is formed into the shaft 66 between the mid-portion 75 of the shaft 66 and the second portion 71 of the shaft 66. The second recessed ring 85 has a reduced diameter V (FIG. 15) as compared to the overall shaft diameter W, and a length U. The reduced diameter V is between 0.4 and 0.8 mm, such as in the range of 0.5 and 0.7 mm. In a preferred embodiment, the reduced diameter I is about 0.6 mm. Alternatively stated, the reduced diameter V is about 0.1 mm less than the diameter W of the shaft 66. The length U is in the range of 0.1 mm to 0.5 mm, such as between 0.2 mm and 0.4 mm. In a preferred embodiment, the length U is about 0.25 mm. When the first pin 63 is installed into the first ferrule 18, the second recessed ring 85 will be located proximate the exit of the first hole 13 in the front face 17 of the first ferrule 18. The second recessed ring 85 insures that the offset nature of the second portion 71 is spaced from the front face 17 of the first ferrule 18, so that the first pin 63 can rotate without binding within the first hole 13.

The second portion 71 of the shaft 66 may be provided with a rounded nose 87. In a preferred embodiment, the rounded nose 87 is formed only proximate the second end 73, the remaining length T of the second portion 71 is formed in a cylindrical fashion, centered on axis B, with the same diameter W as the shaft 66. The length T is greater than 0.3 mm, such as between 0.4 mm and 2 mm, or between 0.6 mm and 1 mm. In a preferred embodiment, the length T is about 0.83 mm. The rounded nose 87 assists in coarse alignment to start the first pin 63 into the corresponding hole 29 or 31 of a mating female MPO connector (FIG. 3).

Further dimensions of the first pin are shown in FIGS. 12 and 14. For example, a distance Z exists between the first end 69 and the mid-portion side of the second recessed ring 85. The distance Z is the combination of the distances P, J and H. In a preferred embodiment, the distance Z is approximately 12.25 mm. A distance R exists between the second end 73 and the mid-portion side of the first recessed ring 77. The distance R is the combination of the distances Y, U and H. In a preferred embodiment, the distance R is approximately 9.88 mm. A distance Q exists between the second end 73 and the first portion side of the first recessed ring 77. The distance Q is the combination of the distances Y, U, H and J. In a preferred embodiment, the distance Q is approximately 10.13 mm. In a preferred embodiment, the various distances and diameters, as mentioned above, are selected so that the first pin 63 can be fitted into a first ferrule 18 of a typical or pre-existing size and shape. In particular, the diameter and depth of the first hole 13 of the first ferrule 18 does not need to be changed, and the first ferrule 18 can be made using unmodified equipment in the same manner as currently manufactured.

The second pin 65 may be constructed in the same or similar manner as the first pin 63 with the same or similar dimensions. For example, the second pin 65 may be mostly formed as a generally elongated second shaft 66' with a third portion 67' proximate a first end 69' of the second shaft 65. The third portion 67' having a second tool surface feature 83 configured to be engaged by a tool to impart a rotation to the second shaft 66'.

A fourth portion 71' resides proximate a second end 73' of the second shaft 66'. A mid-portion 75' of the shaft 66' resides between the third portion 67' and the fourth portion 71'. The mid-portion 75' is substantially cylindrical and centered on an axis A'. The fourth portion 71' is a substantially cylindrical section and centered on an axis B', where the axis B' is parallel to, but offset from, the axis A' by a distance X'. In one embodiment, the distance X' is at least 1.5 um, such as greater than 2.0 um from said axis A'. In a preferred embodiment, the distance X' is at least 3.0 um.

A first recessed ring 77' is formed into the second shaft 66' between the mid-portion 75' of the second shaft 66' and the third portion 67' of the second shaft 66'. The first recessed ring 77' is dimensioned to fit into a second channel 81 of the pin clamp 61 (See FIG. 8). A second recessed ring 85' is formed into the second shaft 66' between the mid-portion 75' of the second shaft 66' and the fourth portion 71' of the second shaft 66'. When the second pin 65 is installed into the first ferrule 18, the second recessed ring 85' will be located proximate the exit of the second hole 15 in the front face 17 of the first ferrule 18. The second recessed ring 85' insures that the offset nature of the fourth portion 71' is spaced from the front face 17 of the first 18, so that the second pin 65 can rotate without binding within the second hole 15.

The second end 73' of the second shaft 66' may be provided with a rounded nose 87'. The rounded nose 87' assists in course alignment to start the second pin 65 into the corresponding hole 29 or 31 of a mating female MPO connector (FIG. 3).

The first recessed ring 77 of the first pin 63 fits tightly into the first channel 79 of the pin clamp 61. Likewise, the first recessed ring 77' of the second pin 65 fits tightly into the second channel 81 of the pin clamp 61. The tight fit keeps the first and second pin 63 and 65 from rotating within the first and second holes 13 and 15 of the first ferrule 18, respectively. In addition, the first and second pins 63 and 65 may tightly fit into the first and second holes 13 and 15, respectively, due to close tolerances, and the close tolerances resist free rotation of the first and second pins 63 and 65.

A technician can use a tool on the tool surfaces 70 and 83 to overcome the resistance against rotation and set a desired angular position or clocking of the first pin 63 and/or the second pin 65. Once the desired angular position is obtained, the resistance caused by the first and second channels 79 and 81 (and/or by the first and second holes 13 and 15) holds the pins in the desired angular position.

Figure 15:
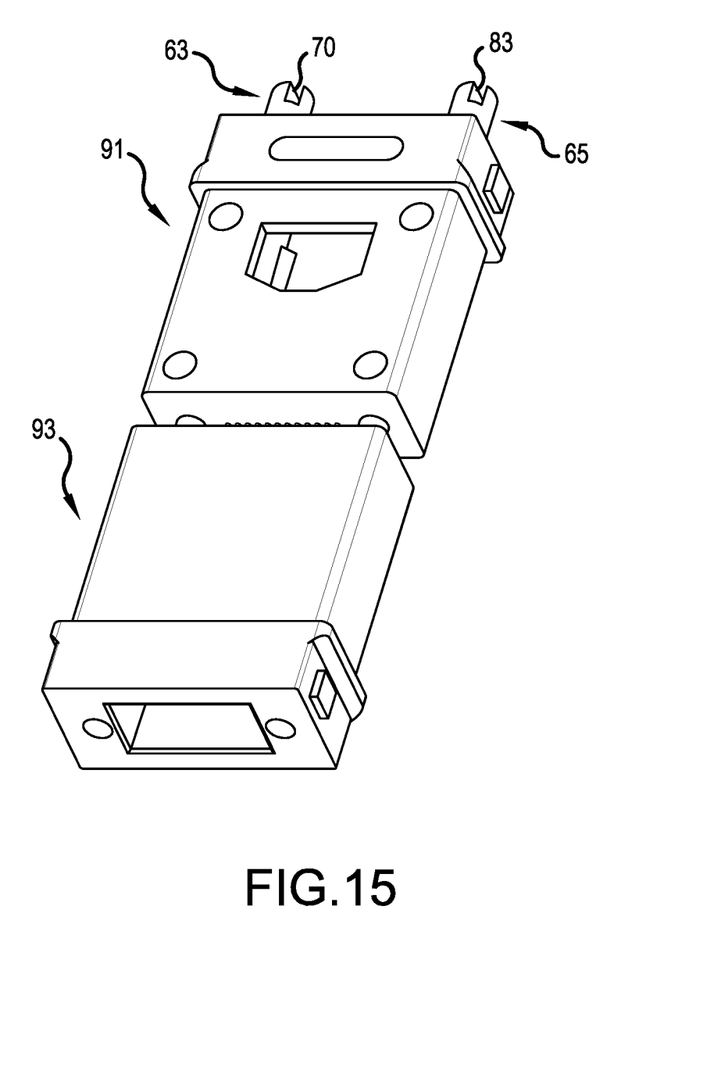
FIG. 15 is a perspective view of first and second MPO connector just prior to being fully mated.
Figure 16:
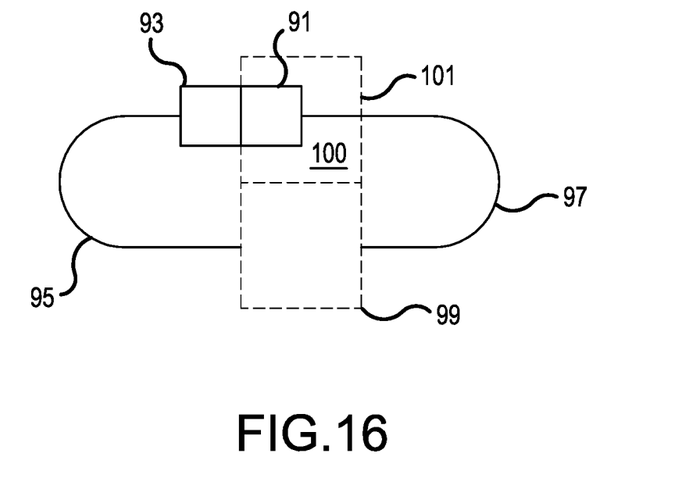
FIG. 16 is a diagram depicting a tuning device.

Next, with reference to FIGS. 15 and 16, a machine 101 to assist in calibrating a mated pair of first and second MPO connectors 91 and 93 to form a matched pair with minimized insertion loss across the mated channels will be described. The machine 101 (FIG. 16) includes a platform 100 with mechanical equipment to hold at least a first MPO connector 91. The mechanical equipment may include the adapter 59 of FIG. 7. FIG. 15 shows the mated first and second MPO connectors 91 and 93.

Electronic equipment 99 generates a constant light signal and transmits it to a first fiber of a first multi-fiber cable 97. The first fiber of the first multi-fiber cable 97 inserts light into a first channel of the first MPO connector 91. The light transfers to a first channel of the second MPO connector 93, due to the mated arrangement of the first MPO connector 91 to the second MPO connector 93. Light from the first channel of the second MPO connector 93 travels along a first fiber of a second multi-fiber cable 95 back to the electronic equipment 99.

Next, the electronic equipment 99 measures a light output, or intensity level, from the first fiber of the second multi-fiber cable 95. A technician or an automated drive system moves, e.g., rotates, the first pin 63 associated with the first MPO connector 91 via the first tool surface feature 70. The technician or drive system stops moving the first pin 63 at a point where the measured light output from the first fiber of the second multi-fiber cable 95 is approximately maximized. As an example, the first pin 63 is rotated three hundred sixty degrees and the light intensity is constantly measured to determine all light intensities for all possible angles of the first pin 63. If a peak light intensity is measured at one hundred eighty seven degrees, the technician or drive system turns the first pin back to one hundred eighty seven degrees, stops and disengages the tool surface feature 70.

In a preferred embodiment, the first channel being used in the above calibration steps relates to a fiber ends 23 closer to the first pin 63 than the second pin 65. The method may then continue to calibrate the performance of the mated first and second MPO connectors 91 and 93, e.g., reduce the channel loss insertion for channels closer to the second pin 65 than the first pin 63. The electronic equipment 99 generates a constant light signal and transmits it to a second fiber of the first multi-fiber cable 97. The second fiber of the first multi-fiber cable 97 inserts light into a second channel of the first MPO connector 91, closer to the second pin 65. The light transfers to a second channel of the second MPO connector 93, due to the mated arrangement of the first MPO connector 91 to the second MPO connector 93 and travels along a second fiber of the second multi-fiber cable 95 back to the electronic equipment 99.

Next, the electronic equipment 99 measures a light output, or intensity level, from the second fiber of the second multi-fiber cable 95. The technician or the automated drive system moves, e.g., rotates, the second pin 65 associated with the first MPO connector 91. The technician or drive system stops moving the second pin 65 at a point where the measured light output from the second fiber of the second multi-fiber cable 95 is approximately maximized. As an example, the second pin 65 is rotated three hundred sixty degrees and the light intensity is constantly measured to determine all light intensities for all possible angles of the second pin 65. If a peak light intensity is measured at sixty seven degrees, the technician or drive system turns the second pin 65 back to sixty seven degrees, stops and disengages the tool surface feature 83. Once the first MPO connector 91 is calibrated to the second MPO connector 93, the two may be packaged and sold together as a match pair.

Different calibration techniques in accordance with the present invention are possible. For instance, light is inserted into plural channels of the first MPO connector 91, via the first multi-fiber cable 97, and light is measured from plural channels of the second MPO connector 93, via the second multi-fiber cable 95. The electronic equipment stops moving, e.g., rotating, the first and/or second pins 63 and/or 65 based upon an algorithm determining when light intensity levels from the plural channels of the second MPO connector are optimized, e.g., attempting to achieve the lowest insertion loss on average among the used channels of the mated MPO connectors 91 and 93.

In formulating this invention, the Applicants have appreciated that fiber alignment is critical to making a low loss connection from one MPO connector 91 to another MPO connector 93. Currently, there is no method to adjust (or tune) the MPO connectors 91 and 93 to achieve optimum loss across all fibers. The present invention shows a fabrication for a first alignment pin 61 that would enable the MPO connectors 91 and 93 to be tuned to one another in order to achieve the lowest possible insertion loss. The first and second pins 63 and 65 could be of several different designs. Although the description has described a cylindrical offset tip, the tip does not need to be cylindrical, e.g., the tip may be bent, an elliptical shape, or another cam-like shape. Once the pins 63 and 65 are installed into a male MPO Connector 91, a simple turn of the first and second pins 63 and 65 would influence the female MPO connector 93 to move relative to the male MPO connector 91.

A monitoring or feedback system 99 could be incorporated as the first and second pins 63 and 65 are rotated in order to determine the optimal placement of the female MPO connector 93 relative to the male MPO connector 91 to yield the lowest insertion loss. In a preferred embodiment, an automated tuning apparatus 101 may be provided whereby the male MPO connector 91 is inserted into the apparatus 101 in order for the first and second pins 63 and 65 to be engaged by a screwdriver-like turning mechanism that will apply pressure on the first and second pins 63 and 65 to disengage them from a locking feature, e.g., the first and second channels 79 and 81, in order to freely rotate the pins 63 and 65. Once the optimal insertion loss has been determined by rotating the first and second pins 63 and 65, the device 101 will release the pressure on the first and second pins 63 and 65, re-engaging the locking feature on the pins, e.g., the first and second channels 79 and 81, hence securing the first and second pins 63 and 65 in the desired, optimal location. Once the first and second pins 63 and 65 are locked in place, the male MPO connector 91 is removed from the automated tuning apparatus 101, and reconnected into the female MPO connector 93, and the optimized pair of MPO connectors 91 and 93 are sold as a matched set. Alternatively, the device 101 may be used by a field technician for active alignment in the field of two independently purchased MPO connectors 91 and 93 in order to minimize connector loss.

The alignment pin locking device, e.g, the first and second channels 79 and 81, can be a friction fit, a sprocket and gear or some sort of lever to hold the first and second pins 63 and 65 in place once adjusted. The first and second pins 63 and 65 could be made to hold firm in place in the locking mechanism by methods involving a spring or some other tensioning or pressure device. This invention could also be applicable to a hermaphroditic connector (see FIGS. 5-7) to where each side of the MPO connector has a single pin that has the camming feature.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A combination comprising:
   a pin for use in a fiber optic connector, said pin being a generally elongated shaft extending along an axis A;
   a first portion proximate a first end of said shaft, said first portion having a tool surface feature configured to be engaged by a tool to impart a rotation to said shaft;
   a second portion proximate a second end of said shaft, said second portion including a protruding peripheral portion which extends further away from said axis A than other peripheral portions of said second portion of said shaft; and
   a mid-portion of said shaft residing between said first portion and said second portion, wherein said mid-portion of said shaft is substantially cylindrical and centered on said axis A.

2. The combination according to claim 1, wherein said second portion is substantially cylindrical and centered on an axis B, and wherein said axis B is offset relative to said axis A.

3. The combination according to claim 2, wherein said axis B is parallel to said axis A and offset by at least 1.0 um from said axis A.

4. The combination according to claim 2, further comprising:
   a first recessed ring formed into said shaft between said mid-portion of said shaft and said first portion of said shaft.

5. The combination according to claim 4, wherein said first recessed ring is dimensioned to fit into a pin clamp of a fiber optic connector.

6. The combination according to claim 4, further comprising:
   a second recessed ring formed into said shaft between said mid-portion of said shaft and said second portion of said shaft.

7. The combination according to claim 1, wherein said tool surface feature is a slot cut into said first end of said shaft to engage with a screwdriver.

8. The combination according to claim 1, wherein said second end of said shaft includes a rounded nose.

9. The combination according to claim 1, further comprising:
   a pin clamp, wherein said pin clamp is attached to said pin and holds said pin in any angular position to which said pin is rotated.

10. The combination according to claim 9, wherein said pin is a first pin, said shaft is a first shaft, said tool surface feature is a first tool surface feature and said mid-portion is a first mid-portion, and further comprising:

a second pin for use in the fiber optic connector, said second pin being a generally elongated second shaft extending along an axis C;

a third portion proximate a first end of said second shaft, said third portion having a second tool surface feature configured to be engaged by a tool to impart a rotation to said second shaft;

a fourth portion proximate a second end of said second shaft, said fourth portion including a protruding peripheral portion which extends further away from said axis C than other peripheral portions of said fourth portion of said second shaft; and a second mid-portion of said second shaft residing between said third portion and said fourth portion, and wherein said pin clamp is also attached to said second pin.

11. The combination according to claim 10, further comprising:

an MT type ferrule, wherein said pin clamp is located behind or within said ferrule, and wherein said first and second pins pass through first and second holes in said ferrule and extend from a front face of said ferrule.

12. The combination according to claim 11, further comprising:

MPO connector envelope features attached to said ferrule to form a male MPO connector.

13. A combination comprising:

MPO connector envelope;

an MT type ferrule connected to said MPO connector envelope;

a pin clamp attached to said ferrule;

a first pin attached to said pin clamp, said first pin being a generally elongated first shaft extending along an axis A;

a first portion proximate a first end of said first shaft, said first portion having a first tool surface feature configured to be engaged by a tool to impart a rotation to said first shaft;

a second portion proximate a second end of said first shaft, a first mid-portion of said first shaft residing between said first portion and said second portion of said first shaft and being formed in a substantially cylindrical form centered on said axis A, and wherein said second portion is substantially cylindrical and centered on an axis B, and wherein said axis B is offset relative to said axis A;

a second pin attached to said pin clamp, said second pin being a generally elongated second shaft extending along an axis C;

a third portion proximate a first end of said second shaft, said third portion having a second tool surface feature configured to be engaged by a tool to impart a rotation to said second shaft; and a fourth portion proximate a second end of said second shaft, a second mid-portion of said second shaft residing between said third portion and said fourth portion of said second shaft and being formed in a substantially cylindrical form centered on said axis C, and wherein said fourth portion is substantially cylindrical and centered on an axis D, and wherein said axis D is offset relative to said axis C;

wherein said first and second pins pass through first and second holes in said ferrule and extend from a front face of said ferrule.

14. The combination according to claim 13, wherein said pin clamp holds said first pin in any angular position to which said first pin is rotated, and holds said second pin in any angular position to which said second pin is rotated.

15. The combination according to claim 13, wherein said axis B is parallel to said axis A and offset by at least 2.0 um from said axis A, and wherein said axis C is parallel to said axis D and offset by at least 2.0 um from said axis D.

16. A method of minimizing insertion loss between mating channels of mated MPO connectors comprising:

mating a first MPO connector to a second MPO connector;

inserting light into a first channel of the first MPO connector;

measuring a light output from a first channel of the second MPO connector, wherein the first channel of the second MPO connector is mated to the first channel of the first MPO connector;

moving a pin associated with the first MPO connector, wherein the pin is engaged within a hole of the second MPO connector; and stopping the moving of the pin at a point where the measured light output from the first channel of the second MPO connector is approximately maximized.

17. The method of claim 16, wherein light is inserted into plural channels of the first MPO connector and wherein light is measured from plural channels of the second MPO connector, and wherein said stopping step occurs based upon an algorithm determining when light from the plural channels of said second MPO connector is optimized or maximized on average on each channel.

18. The method of claim 16, wherein said moving step includes rotating the pin.

19. The method of claim 18, wherein said rotating step is accomplished by a tool engaging a mating tool surface feature proximate an end of the pin.

20. The method of claim 18, wherein the pin is a first pin and wherein the first MPO connector also includes a second pin, wherein the hole is a first hole and wherein the second MPO connector also includes a second hole, wherein said mating step includes inserting the first and second pins into the first and second holes; and wherein said rotating step includes rotating both the first and second pins.

* * * * *